(12) United States Patent
Endoh et al.

(10) Patent No.: US 11,462,102 B2
(45) Date of Patent: Oct. 4, 2022

(54) STORAGE MEDIUM, ESTIMATION DEVICE, AND ESTIMATION METHOD

(71) Applicant: FUJITSU LIMITED, Kawasaki (JP)

(72) Inventors: Toshio Endoh, Yokohama (JP); Kazuhiro Matsumoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 99 days.

(21) Appl. No.: 16/827,786

(22) Filed: Mar. 24, 2020

(65) Prior Publication Data

US 2020/0226923 A1   Jul. 16, 2020

Related U.S. Application Data

(63) Continuation of application No. PCT/JP2017/035591, filed on Sep. 29, 2017.

(51) Int. Cl.
*G08G 1/01* (2006.01)

(52) U.S. Cl.
CPC .................. *G08G 1/0145* (2013.01)

(58) Field of Classification Search
CPC .................................................. G08G 1/0145
See application file for complete search history.

(56) References Cited

U.S. PATENT DOCUMENTS

2009/0059793 A1* 3/2009 Greenberg .......... H04L 41/5009
370/235

FOREIGN PATENT DOCUMENTS

| CN | 105046350 | 11/2015 |
|---|---|---|
| CN | 105404934 | 3/2016 |
| JP | S49-132484 A | 12/1974 |
| JP | 03-104774 | 5/1991 |
| JP | 10-217968 | 8/1998 |
| JP | 2006-188150 | 7/2006 |
| JP | 2016-038756 A | 3/2016 |
| JP | 2016-168876 | 9/2016 |
| JP | 2017-010225 A | 1/2017 |

(Continued)

OTHER PUBLICATIONS

JPOA—Office Action of Japanese Patent Application No. 2019-544129 dated Dec. 15, 2020 with Full Machine Translation. References cited in the JPOA were previously submitted in the IDS filed on Mar. 24, 2020.

(Continued)

*Primary Examiner* — Tyler J Lee
*Assistant Examiner* — Yufeng Zhang
(74) *Attorney, Agent, or Firm* — Fujitsu Patent Center

(57) ABSTRACT

A non-transitory computer-readable storage medium storing a program that causes a computer to execute a process, the process comprising: calculating parameters of an expression that describes a model that is associated with a traffic system and estimates a traffic volume between a plurality of points, by using a plurality of measurement data measured in the traffic system that connects the plurality of points to each other, by using a method for solving an optimization problem; generating, when an indefinite solution is obtained by the calculating, indefiniteness information related to a range of the indefinite solution in the method for solving the optimization problem; and determining addition of the plurality of measurement data or output of the indefinite solution, depending on the indefiniteness information.

15 Claims, 15 Drawing Sheets

(56) References Cited

FOREIGN PATENT DOCUMENTS

| | | |
|---|---|---|
| JP | 2017-91008 | 5/2017 |
| WO | 2014/203391 A1 | 12/2014 |
| WO | 2015/167169 | 11/2015 |

OTHER PUBLICATIONS

EPOA—Office Action of European Patent Application No. 17926612.7 dated Jun. 1, 2021. References D1-D3 cited in the EPOA were previously submitted in the IDS filed on Oct. 5, 2020.
EESR—The Extended European Search Report of European Patent Application No. 17926612.7 dated Jul. 10, 2020.
JPOA—Office Action of Japanese Patent Application No. 2019-544129 dated Mar. 16, 2021 with Full Machine Translation. References cited in the JPOA were previously submitted in the IDS filed on Mar. 24, 2020.
International Search Report and Written Opinion of the International Searching Authority (Form PCT/ISA/210 & 237), mailed in connection with PCT/JP2017/035591 and dated Jan. 9, 2018 (Total 8 pages).
EPOA—Summons to attend oral proceedings pursuant to Rule 115(1) EPC of European Patent Application No. 17926612.7 mailed on Apr. 4, 2022. References cited in the EPOA were previously submitted in the IDS filed on Oct. 5, 2020.

\* cited by examiner

| | | | |
|---|---|---|---|
| $G_A$ | 50 | $A_A$ | 70 |
| $G_B$ | 70 | $A_B$ | 40 |
| $G_C$ | 60 | $A_C$ | 70 |
| $P_{AB}$ | 50 | $P_{BC}$ | 70 |
| $P_{BA}$ | 70 | $P_{CB}$ | 60 |

FIG. 6

CONSTRAINT EXPRESSION:

$T_{AB}+T_{AC}=G_A \cdots (1.1)$, $T_{BA}+T_{CA}=A_A \cdots (2.1)$, $T_{BA}+T_{BC}=G_B \cdots (1.2)$, $T_{AB}+T_{CB}=A_B \cdots (2.2)$, $T_{CA}+T_{CB}=G_C \cdots (1.3)$, $T_{AC}+T_{BC}=A_C \cdots (2.3)$ $T_{AB}, T_{AC}, T_{BA}, T_{BC}, T_{CA}, T_{CB} \geqq 0$

EVALUATION FUNCTION:

$|T_{AB}+T_{AC}-P_{AB}| + |T_{AC}+T_{BC}-P_{BC}| + |T_{BA}+T_{CA}-P_{BA}| + |T_{CA}+T_{CB}-P_{CB}| \cdots (4)$ EVALUATION EXPRESSION (3.1)    EVALUATION EXPRESSION (3.2)    EVALUATION EXPRESSION (3.3)    EVALUATION EXPRESSION (3.4)

FIG. 7

OD INFORMATION FROM 0:00 TO 1:00
OBTAINED AS SOLUTION

SOLUTION $OD_{01}$

| OD INFORMATION FROM 0:00 TO 1:00 | | DEPARTURE (O) | | |
|---|---|---|---|---|
| | | A STATION | B STATION | C STATION |
| ARRIVAL (D) | A STATION | | 50 $(=T_{BA})$ | 20 $(=T_{CA})$ |
| | B STATION | 0 $(=T_{AB})$ | | 40 $(=T_{CB})$ |
| | C STATION | 50 $(=T_{AC})$ | 20 $(=T_{BC})$ | |

ANOTHER OD INFORMATION FROM 0:00 TO 1:00

| OD INFORMATION FROM 0:00 TO 1:00 | | DEPARTURE (O) | | |
|---|---|---|---|---|
| | | A STATION | B STATION | C STATION |
| ARRIVAL (D) | A STATION | | 10 $(=T_{BA})$ | 60 $(=T_{CA})$ |
| | B STATION | 40 $(=T_{AB})$ | | 0 $(=T_{CB})$ |
| | C STATION | 10 $(=T_{AC})$ | 60 $(=T_{BC})$ | |

FIG. 9A

CORRECT ANSWER OD INFORMATION $OD_{01}$

| OD INFORMATION FROM 0:00 TO 1:00 | | DEPARTURE (O) | | |
|---|---|---|---|---|
| | | A STATION | B STATION | C STATION |
| ARRIVAL (D) | A STATION | | 30 | 40 |
| | B STATION | 20 | | 20 |
| | C STATION | 30 | 40 | |

⇩

CORRECT ANSWER OD INFORMATION $OD_{12}$

| OD INFORMATION FROM 1:00 TO 2:00 | | DEPARTURE (O) | | |
|---|---|---|---|---|
| | | A STATION | B STATION | C STATION |
| ARRIVAL (D) | A STATION | | 20 | 20 |
| | B STATION | 30 | | 40 |
| | C STATION | 40 | 30 | |

⇩ 21 ($D_{12}$)

NUMBER OF ENTERING AND EXITING PEOPLE AT EACH STATION FROM 1:00 TO 2:00 AND NUMBER OF PASSENGERS ON TRAIN AT 2:00

| $G_A$ | 70 | $A_A$ | 40 |
| $G_B$ | 50 | $A_B$ | 70 |
| $G_C$ | 60 | $A_C$ | 70 |
| $P_{AB}$ | 70 | $P_{BC}$ | 70 |
| $P_{BA}$ | 40 | $P_{CB}$ | 60 |

⇩

SOLUTION $OD_{12}$

| OD INFORMATION FROM 1:00 TO 2:00 OBTAINED AS SOLUTION | | DEPARTURE (O) | | |
|---|---|---|---|---|
| | | A STATION | B STATION | C STATION |
| ARRIVAL (D) | A STATION | | 0 | 40 |
| | B STATION | 50 | | 20 |
| | C STATION | 20 | 50 | |

FIG. 9B
DELAY PATTERN x
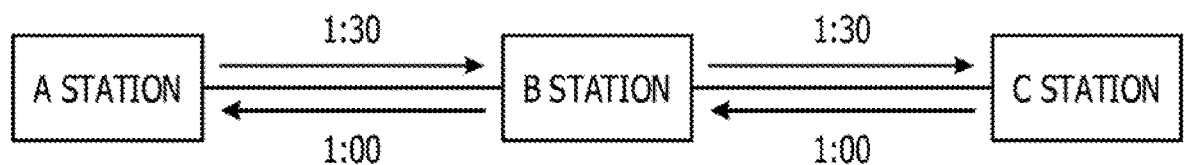
DELAY PATTERN y
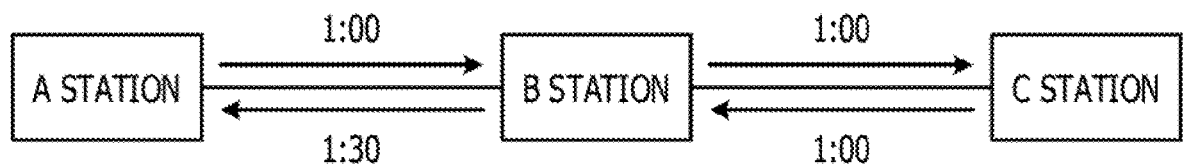

FIG. 9C

| CORRECT ANSWER $OD_{01}$ | CORRECT ANSWER $OD_{12}$ |
|---|---|
| ⇩ | ⇩ |

CORRECT ANSWER FOR DELAY PATTERN x
(NUMBER OF ENTERING AND EXITING PEOPLE AT EACH STATION FROM 0:00 TO 1:00 AND NUMBER OF PASSENGERS ON TRAIN AT 1:00 AND 1:30)

| $G_A$ | 50 | $A_A$ | 70 |
| $G_B$ | 70 | $A_B$ | 20 |
| $G_C$ | 60 | $A_C$ | 0 |
| $P_{AB}$ | 85 | $P_{BC}$ | 105 |
| $P_{BA}$ | 70 | $P_{CB}$ | 60 |

← $Dx_{01}$

CORRECT ANSWER FOR DELAY PATTERN x
(NUMBER OF ENTERING AND EXITING PEOPLE AT EACH STATION FROM 1:00 TO 2:00 AND NUMBER OF PASSENGERS ON TRAIN AT 2:00)

| $G_A$ | 70 | $A_A$ | 40 |
| $G_B$ | 50 | $A_B$ | 90 |
| $G_C$ | 60 | $A_C$ | 140 |
| $P_{AB}$ | 35 | $P_{BC}$ | 35 |
| $P_{BA}$ | 40 | $P_{CB}$ | 60 |

← $Dx_{12}$

CORRECT ANSWER FOR DELAY PATTERN y
(NUMBER OF ENTERING AND EXITING PEOPLE AT EACH STATION FROM 0:00 TO 1:00 AND NUMBER OF PASSENGERS ON TRAIN AT 1:00 AND 1:30)

| $G_A$ | 50 | $A_A$ | 0 |
| $G_B$ | 70 | $A_B$ | 40 |
| $G_C$ | 60 | $A_C$ | 70 |
| $P_{AB}$ | 50 | $P_{BC}$ | 70 |
| $P_{BA}$ | 80 | $P_{CB}$ | 60 |

← $Dy_{01}$

CORRECT ANSWER FOR DELAY PATTERN y
(NUMBER OF ENTERING AND EXITING PEOPLE AT EACH STATION FROM 1:00 TO 2:00 AND NUMBER OF PASSENGERS ON TRAIN AT 2:00)

| $G_A$ | 70 | $A_A$ | 110 |
| $G_B$ | 50 | $A_B$ | 70 |
| $G_C$ | 60 | $A_C$ | 70 |
| $P_{AB}$ | 70 | $P_{BC}$ | 70 |
| $P_{BA}$ | 30 | $P_{CB}$ | 60 |

SOLUTION $OD_{01}$ ⇩  SOLUTION $OD_{12}$ ⇩

ESTIMATED VALUE FOR DELAY PATTERN x
(NUMBER OF ENTERING AND EXITING PEOPLE AT EACH STATION FROM 0:00 TO 1:00 AND NUMBER OF PASSENGERS ON TRAIN AT 1:00 AND 1:30)

| | | | |
|---|---|---|---|
| $G_A$ | 50 | $A_A$ | 70 |
| $G_B$ | 70 | $A_B$ | 40 |
| $G_C$ | 60 | $A_C$ | 0 |
| $P_{AB}$ | 85 | $P_{BC}$ | 105 |
| $P_{BA}$ | 70 | $P_{CB}$ | 60 |

← $Dx_{01}'$

ESTIMATED VALUE FOR DELAY PATTERN x
(NUMBER OF ENTERING AND EXITING PEOPLE AT EACH STATION FROM 1:00 TO 2:00 AND NUMBER OF PASSENGERS ON TRAIN AT 2:00)

| | | | |
|---|---|---|---|
| $G_A$ | 70 | $A_A$ | 40 |
| $G_B$ | 50 | $A_B$ | 70 |
| $G_C$ | 60 | $A_C$ | 140 |
| $P_{AB}$ | 35 | $P_{BC}$ | 35 |
| $P_{BA}$ | 40 | $P_{CB}$ | 60 |

← $Dx_{12}'$

ESTIMATED VALUE FOR DELAY PATTERN y
(NUMBER OF ENTERING AND EXITING PEOPLE AT EACH STATION FROM 0:00 TO 1:00 AND NUMBER OF PASSENGERS ON TRAIN AT 1:00 AND 1:30)

| | | | |
|---|---|---|---|
| $G_A$ | 50 | $A_A$ | 0 |
| $G_B$ | 70 | $A_B$ | 40 |
| $G_C$ | 60 | $A_C$ | 70 |
| $P_{AB}$ | 50 | $P_{BC}$ | 70 |
| $P_{BA}$ | 70 | $P_{CB}$ | 60 |

← $Dy_{01}'$

ESTIMATED VALUE FOR DELAY PATTERN y
(NUMBER OF ENTERING AND EXITING PEOPLE AT EACH STATION FROM 1:00 TO 2:00 AND NUMBER OF PASSENGERS ON TRAIN AT 2:00)

| | | | |
|---|---|---|---|
| $G_A$ | 70 | $A_A$ | 110 |
| $G_B$ | 50 | $A_B$ | 70 |
| $G_C$ | 60 | $A_C$ | 70 |
| $P_{AB}$ | 70 | $P_{BC}$ | 70 |
| $P_{BA}$ | 40 | $P_{CB}$ | 60 |

← $Dy_{12}'$

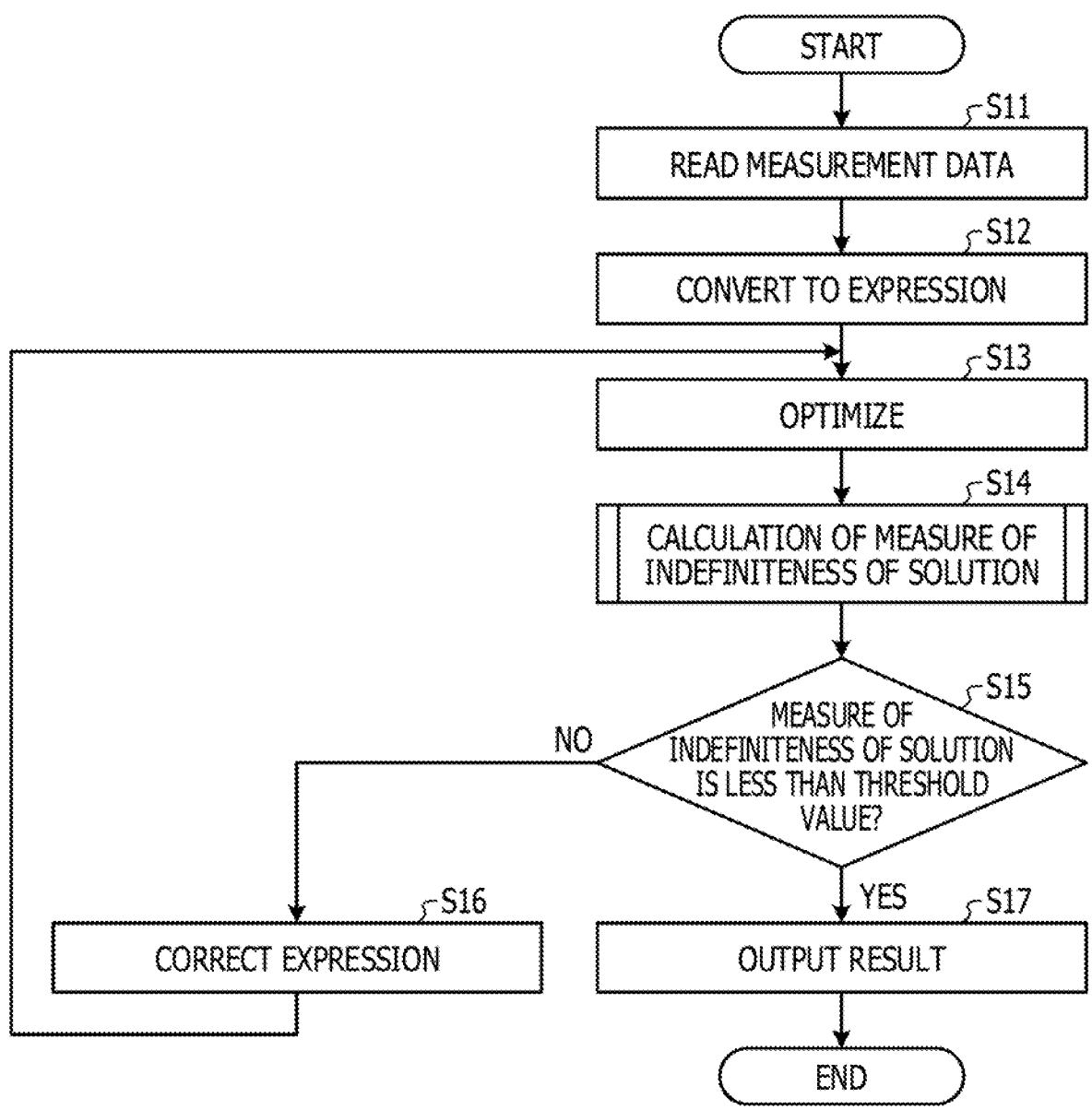

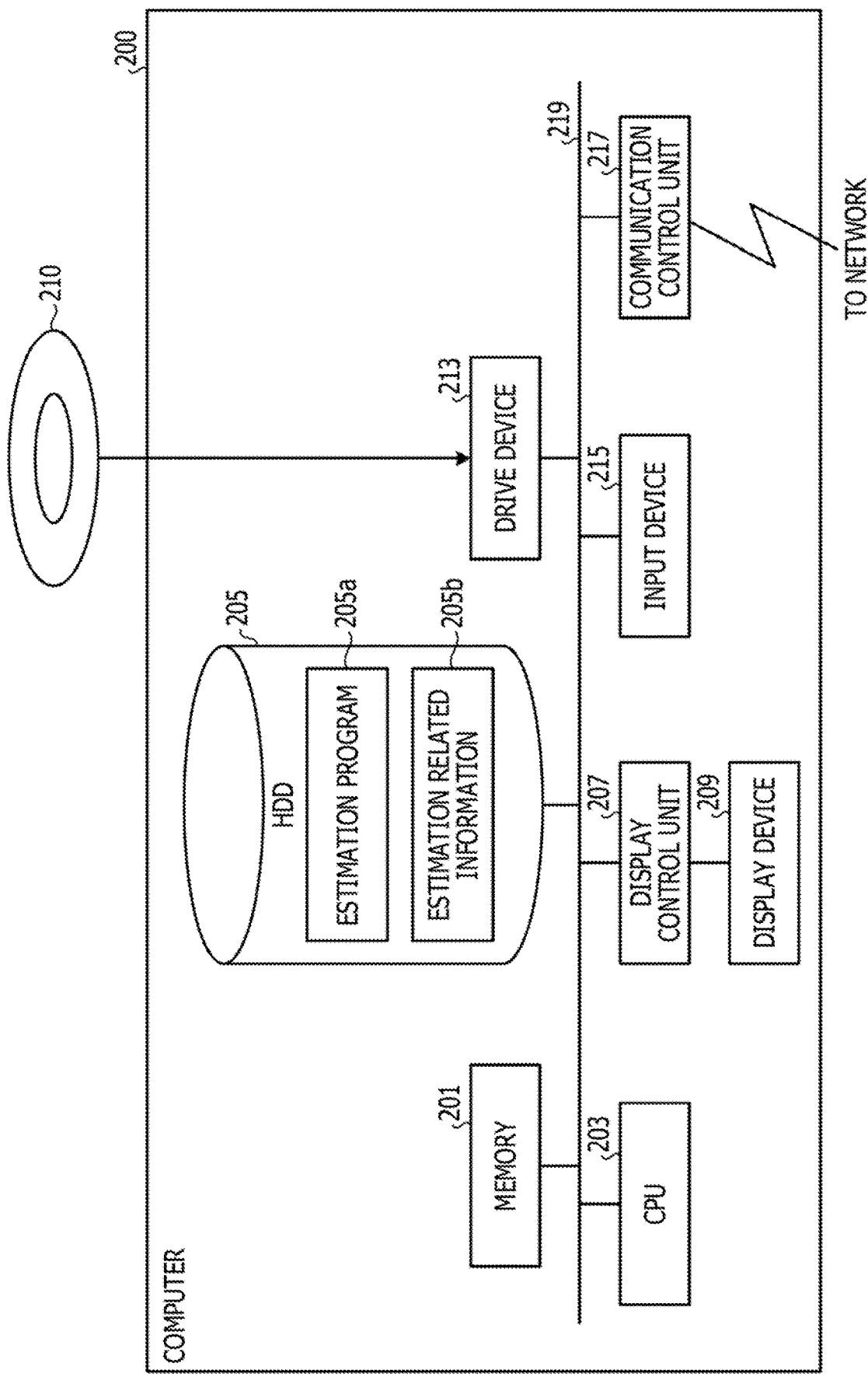

STORAGE MEDIUM, ESTIMATION DEVICE, AND ESTIMATION METHOD

CROSS-REFERENCE TO RELATED APPLICATION

This application is a continuation application of International Application PCT/JP2017/035591 filed on Sep. 29, 2017 and designated the U.S., the entire contents of which are incorporated herein by reference.

FIELD

The present invention relates to a storage medium, an estimation device, and an estimation method.

BACKGROUND

In traffic systems such as railroads, buses, and highways, congestion prediction and traffic jam prediction are performed when an abnormality occurs such as an accident. Origin destination (OD) information is used for such prediction when the abnormality occurs. OD information refers to a traffic volume from one representative point (point) to another representative point (point).

Examples of an OD information estimation method include a method for estimating OD information by using survey (questionnaire) results for users who use a target traffic facility in a traffic system, traffic behavior histories recorded on IC cards of the users, and the like.

Furthermore, as another OD information estimation method, a method is known for estimating OD information by combining the traffic behavior histories acquired from the users and congestion information. For example, International Publication Pamphlet No. WO 2014/203391 or the like is disclosed as related art.

SUMMARY

According to an aspect of the embodiments, a non-transitory computer-readable storage medium storing a program that causes a computer to execute a process, the process comprising: calculating parameters of an expression that describes a model that is associated with a traffic system and estimates a traffic volume between a plurality of points, by using a plurality of measurement data measured in the traffic system that connects the plurality of points to each other, by using a method for solving an optimization problem; generating, when an indefinite solution is obtained by the calculating, indefiniteness information related to a range of the indefinite solution in the method for solving the optimization problem; and determining addition of the plurality of measurement data or output of the indefinite solution, depending on the indefiniteness information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating a specific example of the measurement data information from 0:00 to 1:00.

FIG. 6 is a diagram illustrating examples of expressions used in an expression conversion unit.

FIG. 7 is a diagram illustrating a specific example of an optimization unit.

FIG. 9A is a diagram (1) illustrating influence of indefiniteness of OD information.

FIG. 9B is a diagram (2) illustrating the influence of the indefiniteness of the OD information.

FIG. 9C is a diagram (3) illustrating the influence of the indefiniteness of the OD information.

FIG. 9D is a diagram (4) illustrating the influence of the indefiniteness of the OD information.

FIG. 10 is a diagram illustrating an example of a flowchart of estimation processing according to the embodiment.

FIG. 12 is a diagram illustrating an example of a computer that executes an estimation program.

DESCRIPTION OF EMBODIMENTS

However, there is a problem that it is difficult to estimate appropriate OD information using available data in a traffic system.

For example, it is possible to estimate OD information by using survey (questionnaire) results for users and traffic behavior histories of the users. However, it takes a huge cost for the survey for the users, and the traffic behavior histories of the users vary for each traffic system. Thus, the survey results for the users and the traffic behavior histories of the users cannot be said to be available data for each traffic system. Furthermore, even with the other OD information estimation method, the traffic behavior histories of the users vary for each traffic system, so it cannot be said to be available data for each traffic system. Thus, it is difficult for conventional OD information estimation methods to estimate appropriate OD information by using available data.

Furthermore, OD information is affected by a traffic use environment such as weather, day of the week, and presence of an event when traffic in a traffic system is used, so the OD information is desirably estimated by using a small amount of data that is least affected. On the other hand, in a case where an estimation result is not appropriate, measures are required such as increasing the data used for estimation. In the conventional OD information estimation method, it is difficult to estimate appropriate OD information because OD information estimation is not performed in consideration of these contradictory constraints. In view of the above, it is desirable to estimate appropriate OD information by using available data in a traffic system.

Hereinafter, an embodiment will be described in detail of an estimation device, an estimation program, and an estimation method disclosed in the present application with reference to the drawings. This invention is not limited to the embodiment.

Embodiment

Configuration of Estimation Device

Figure 1:
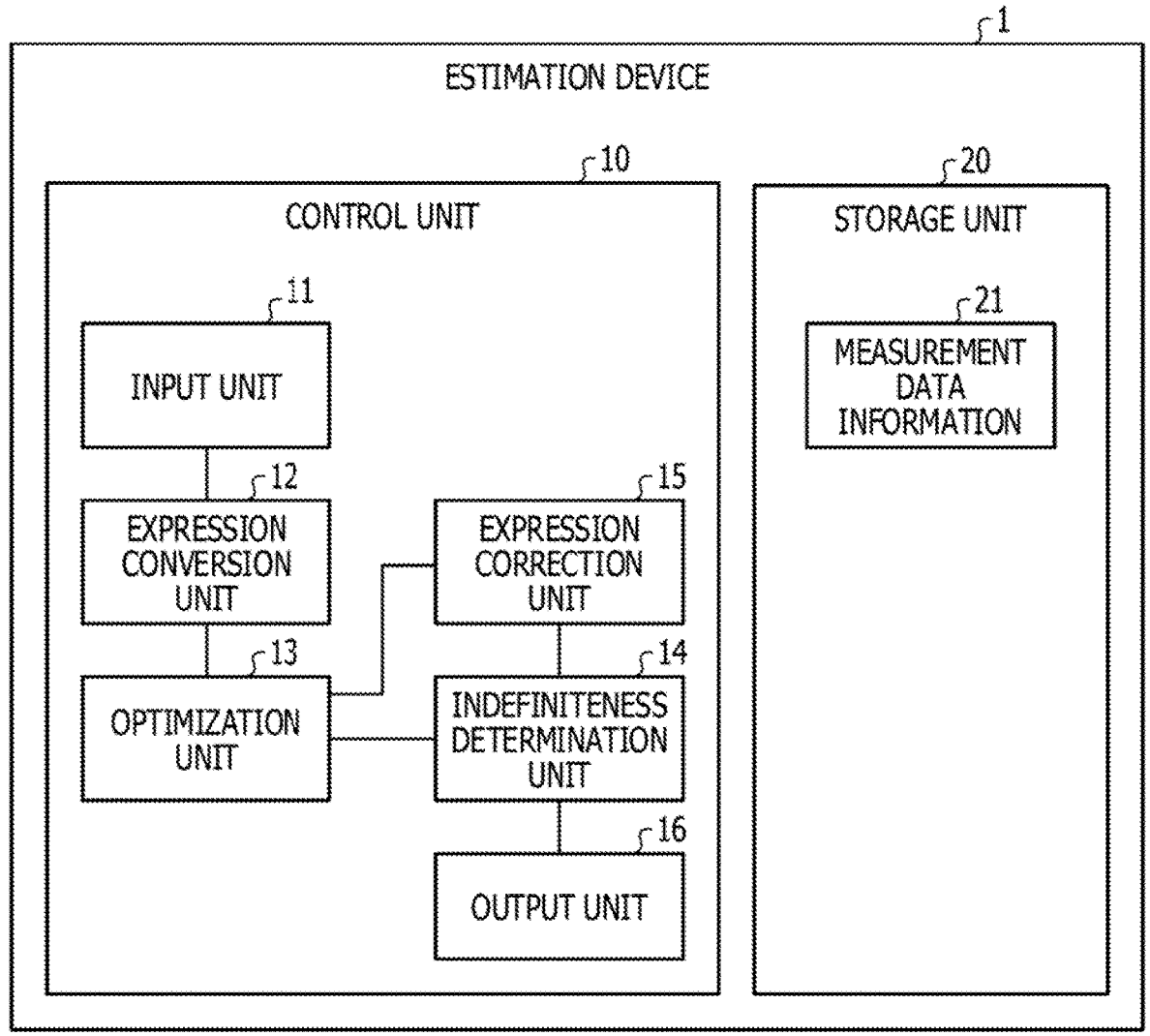
FIG. 1 is a functional block diagram illustrating a configuration of an estimation device according to an embodiment.

FIG. 1 is a diagram illustrating an example of a functional configuration of an estimation device according to the embodiment. As illustrated in FIG. 1, an estimation device 1 estimates OD information of a traffic system by using available data. OD information refers to a traffic volume from one representative point (point) to another representative point (point). In the embodiment, a railroad traffic system will be described as an example; however, the present invention is not limited to the example, and is also applicable to general traffic systems such as buses and highways.

The estimation device 1 includes a control unit 10 and a storage unit 20.

The control unit 10 corresponds to an electronic circuit such as a central processing unit (CPU). Then, the control unit 10 includes an internal memory for storing programs defining various processing procedures and control data, and executes various types of processing using the programs and the control data. The control unit 10 includes an input unit 11, an expression conversion unit 12, an optimization unit 13, an indefiniteness determination unit 14, an expression correction unit 15, and an output unit 16. The expression conversion unit 12 and the optimization unit 13 are examples of a calculation unit. The indefiniteness determination unit 14 is an example of a generation unit and a determination unit.

The storage unit 20 is, for example, a semiconductor memory device such as a random access memory (RAM) and a flash memory, or a storage device such as a hard disk or an optical disk. The storage unit 20 includes, for example, measurement data information 21.

The measurement data information 21 is information including a plurality of data measured in a traffic system. Examples of the measurement data information 21 include the number of entering people and the number of exiting people at each station, and the number of passengers on a train between adjacent stations. As an example, the number of entering people and the number of exiting people at each station can be measured by a camera or a weight scale installed at each station. As an example, the number of passengers on the train between adjacent stations can be measured by a camera or a weight scale installed in each vehicle of the train. It is expected that the number of entering people and the number of exiting people at each station and the number of passengers on the train between adjacent stations are available measurement data for any traffic system. The station is an example of a representative point or a point. The number of entering people is an example of a generated traffic volume. The number of exiting people is an example of a concentrated traffic volume. The number of passengers is an example of an allocated traffic volume.

The input unit 11 inputs the measurement data information 21. A specific example will be described later of the measurement data information 21.

The expression conversion unit 12 converts each data of the measurement data information 21 input by the input unit 11 into an expression that describes a model that is associated with a traffic system and estimates a traffic volume between a plurality of stations. The expression uses OD information as parameters (unknown numbers). An example will be described later of the expression used in the expression conversion unit 12.

The optimization unit 13 calculates parameters of the expression converted by the expression conversion unit 12 by using a method for solving an optimization problem. Furthermore, the optimization unit 13 calculates parameters of an expression corrected by the expression correction unit 15 described later by using the method for solving the optimization problem. The method for solving the optimization problem is, for example, linear programming, but is not limited thereto. In the embodiment, the method for solving the optimization problem will be described as linear programming. Furthermore, a specific example will be described later of the optimization unit 13.

The indefiniteness determination unit 14 determines indefiniteness of a solution optimized by the optimization unit 13. The solution here indicates OD information. For example, in a case where the solution is an indefinite solution, the indefiniteness determination unit 14 calculates a measure of the indefiniteness of the solution related to an existence range of the solutions. The indefiniteness determination unit 14 determines whether or not the measure of the indefiniteness of the solution is greater than or equal to a predetermined threshold value. If the measure of the indefiniteness of the solution is greater than or equal to the threshold value, the indefiniteness determination unit 14 determines that the indefiniteness of the solution has an influence, and transitions to the expression correction unit 15. If the measure of the indefiniteness is less than the threshold value, the indefiniteness determination unit 14 determines that the indefiniteness of the solution does not have an influence, and outputs the solution to the output unit 16. Descriptions will be given later of the measure of the indefiniteness, the existence range of the solutions, and the influence of the indefiniteness of the solution.

The expression correction unit 15 corrects the expression by increasing the measurement data information 21.

The output unit 16 outputs OD information obtained from the solution. To prevent processing from being repeated indefinitely, in a case where the indefiniteness of the solution does not become less than the threshold value after a predetermined number of repetitions, the output unit 16 may output that fact.

Example of Railroad Route Map and Railroad Diagram

A railroad route map and a railroad diagram taken up in the embodiment will be described with reference to FIGS. 2 and 3.

Figure 2:
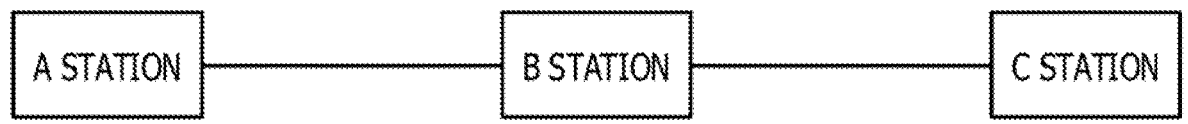
FIG. 2 is a diagram illustrating an example of a target railroad route map.

FIG. 2 is a diagram illustrating an example of a target railroad route map. As illustrated in FIG. 2, a target railroad route is straight, and includes three stations, A station, B station, and C station. The railroad route map illustrated in FIG. 2 is an example for convenience, and the railroad route map is not limited to the example.

Figure 3:
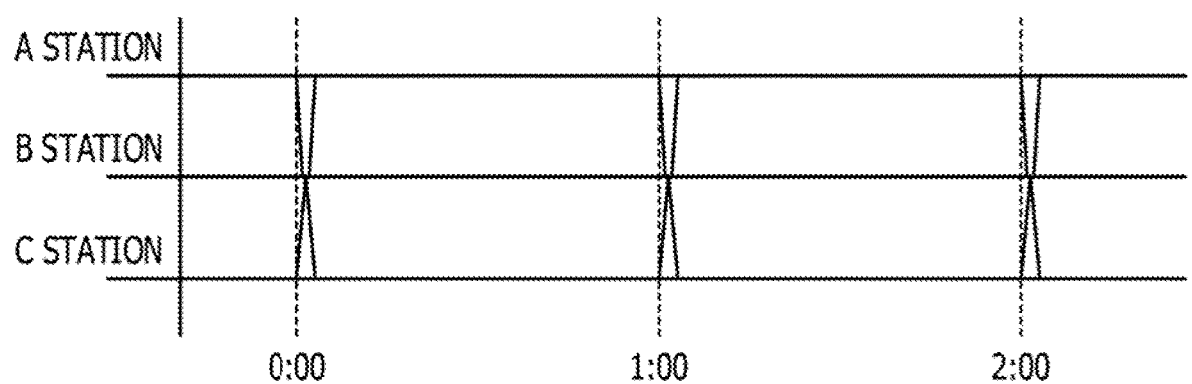
FIG. 3 is a diagram illustrating an example of a target train diagram.

FIG. 3 is a diagram illustrating an example of a target train diagram. As illustrated in FIG. 3, in the target train diagram, trains operate in both directions at 0:00, 1:00, and 2:00 p.m. regularly. The train diagram illustrated in FIG. 3 is an example for convenience, and the train diagram is not limited to the example.

Example of Measurement Data Information

An example will be described of the measurement data information 21 with reference to FIGS. 4 and 5.

Figure 4:
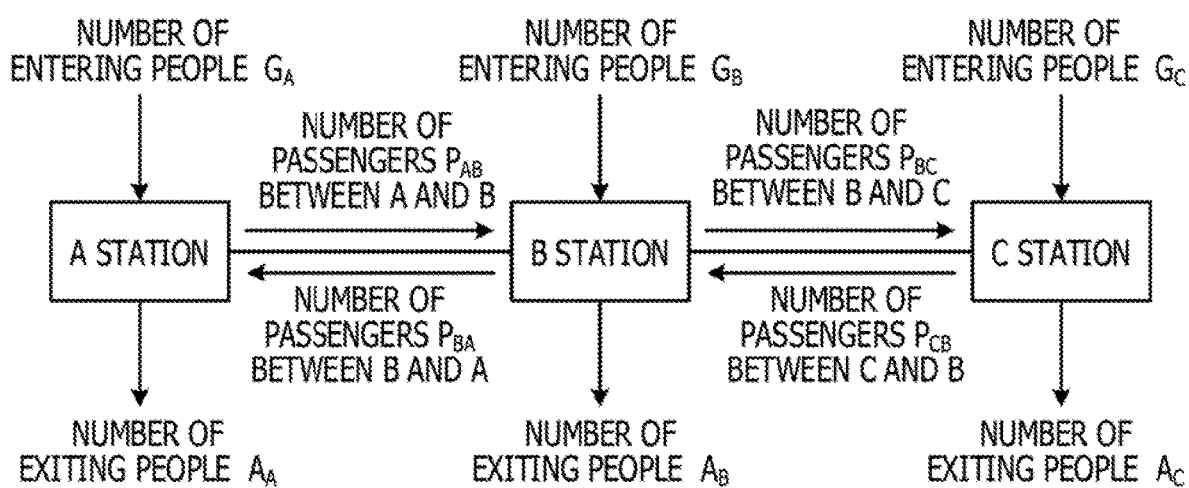
FIG. 4 is a diagram illustrating an example of target measurement data information.

FIG. 4 is a diagram illustrating an example of target measurement data information. The number of entering people and the number of exiting people at each station and the number of passengers on a train between adjacent stations are measured by using, for example, a camera, a weight scale, or the like. As illustrated in FIG. 4, the number of entering people at A station is defined as $G_A$. The number of exiting people at A station is defined as $A_A$. The number of entering people at B station is defined as $G_B$. The number of exiting people at B station is defined as $A_B$. The number of entering people at C station is defined as $G_C$. The number of exiting people at C station is defined as $A_C$. Then, the number of passengers on a train from A station to B station (between A and B) is defined as $P_{AB}$. The number of passengers on a train from B station to A station (between B and A) is defined as $P_{BA}$. The number of passengers on a train from B station to C station (between B and C) is defined as $P_{BC}$. The number of passengers on a train from C station to B station (between C and B) is defined as $P_{CB}$. It is assumed that the train operation time is sufficiently short and movement of users does not occur during train operation. Furthermore, it is also assumed that the users get on the earliest train after entering the station.

FIG. 5 is a diagram illustrating a specific example of the measurement data information from 0:00 to 1:00. As illustrated in FIG. 5, the $G_A$ indicating the number of entering people at A station is set to 50. The $G_B$ indicating the number of entering people at B station is set to 70. The $G_C$ indicating the number of entering people at C station is set to 60. The $A_A$ indicating the number of exiting people at A station is set to 70. The $A_B$ indicating the number of exiting people at B station is set to 40. The $A_C$ indicating the number of exiting people at C station is set to 70. Then, the $P_{AB}$ indicating the number of passengers on the train between A and B is set to 50. The $P_{BC}$ indicating the number of passengers on the train between B and C is set to 70. The $P_{BA}$ indicating the number of passengers on the train between B and A is set to 70. The number of passengers $P_{CB}$ indicating the number of passengers on the train between C and B is set to 60. The measurement data information 21 from 0:00 to 1:00 may be indicated by a reference sign $D_{01}$ hereinafter.

Expressions Used in Expression Conversion Unit

Examples will be described of expressions used in the expression conversion unit 12 with reference to FIG. 6.

FIG. 6 is a diagram illustrating the examples of the expressions used in the expression conversion unit. $T_{AB}$ illustrated in FIG. 6 is defined as OD information from 0:00 to 1:00 from A station to B station. $T_{AC}$ illustrated in FIG. 6 is defined as OD information from 0:00 to 1:00 from A station to C station. $T_{BA}$ illustrated in FIG. 6 is defined as OD information from 0:00 to 1:00 from B station to A station. $T_{BC}$ illustrated in FIG. 6 is defined as OD information from 0:00 to 1:00 from B station to C station. $T_{CA}$ illustrated in FIG. 6 is defined as OD information from 0:00 to 1:00 from C station to A station. $T_{CB}$ illustrated in FIG. 6 is defined as OD information from 0:00 to 1:00 from C station to B station. As illustrated in FIG. 6, the expression conversion unit 12 converts the measurement data information 21 into an expression having the OD information as an unknown number. The conversion method is as follows. (1) Conversion is performed into a constraint expression in which the number of entering people at a station is equal to the sum of OD information with the station as the departure station. (2) Conversion is performed into a constraint expression in which the number of exiting people at a station is equal to the sum of OD information with the station as the arrival station. (3) The number of passengers is converted into an evaluation expression including an absolute value of a difference between the number of passengers predicted from the OD information and the number of passengers as measurement data. (4) The sum of evaluation expressions is defined as an evaluation function.

For (1), the numbers of entering people at the stations are converted into the following constraint expressions. Conversion is performed into a constraint expression (1.1) in which the $G_A$ indicating the number of entering people at A station is equal to the sum of the OD information $T_{AB}$ between A and B and the OD information $T_{AC}$ between A and C. Conversion is performed into a constraint expression (1.2) in which the $G_B$ indicating the number of entering people at B station is equal to the sum of the OD information $T_{BA}$ between B and A and the OD information $T_{BC}$ between B and C. Conversion is performed into a constraint expression (1.3) in which the $G_C$ indicating the number of entering people at C station is equal to the sum of the OD information $T_{CA}$ between C and A and the OD information $T_{CB}$ between C and B.

Furthermore, for (2), the numbers of exiting people at the stations are converted into the following constraint expressions. Conversion is performed into a constraint expression (2.1) in which the $A_A$ indicating the number of exiting people at A station is equal to the sum of the OD information $T_{BA}$ between B and A and the OD information $T_{CA}$ between C and A with A station as the arrival station. Conversion is performed into a constraint expression (2.2) in which the $A_B$ indicating the number of exiting people at B station is equal to the sum of the OD information $T_{AB}$ between A and B and the OD information $T_{CB}$ between C and B with B station as the arrival station. Conversion is performed into a constraint expression (2.3) in which the $A_C$ indicating the number of exiting people at C station is equal to the sum of the OD information $T_{AC}$ between A and C and the OD information $T_{BC}$ between B and C with C station as the arrival station.

Furthermore, for (3), the numbers of passengers are converted into the following evaluation expressions. The number of passengers is converted into an evaluation expression (3.1) including an absolute value of a difference between the $P_{AB}$ indicating the number of passengers on the train between A and B as measurement data and the numbers of passengers $T_{AB}$ and $T_{AC}$ predicted from the OD information. The number of passengers is converted into an evaluation expression (3.2) including an absolute value of a difference between the $P_{BC}$ indicating the number of passengers on the train between B and C as measurement data and the numbers of passengers $T_{AC}$ and $T_{BC}$ predicted from the OD information. The number of passengers is converted into an evaluation expression (3.3) including an absolute value of a difference between the $P_{BA}$ indicating the number of passengers on the train between B and A as measurement data and the numbers of passengers $T_{BA}$ and $T_{CA}$ predicted from the OD information. The number of passengers is converted into an evaluation expression (3.4) including an absolute value of a difference between the $P_{CB}$ indicating the number of passengers on the train between C and B as measurement data and the numbers of passengers $T_{CA}$ and $T_{CB}$ predicted from the OD information.

Furthermore, for (4), an evaluation function is generated as follows. The sum of the individual evaluation expressions (3.1), (3.2), (3.3), and (3.4) is defined as an evaluation function (4). Furthermore, the numbers of passengers $T_{AB}$, $T_{AC}$, $T_{BA}$, $T_{BC}$, $T_{CA}$, and $T_{CB}$ predicted are all greater than or equal to 0.

It is conceivable that data with high measurement accuracy is converted into, for example, a constraint expression, and data with low measurement accuracy is converted into, for example, an evaluation expression. Furthermore, in a case where an error is allowed in the constraint expression, an inequality expression may be used.

Each constraint expression is a linear expression with a non-negative condition. The evaluation function (4) is a piecewise linear function convex downward. Each constraint expression and the evaluation function (4) are expressed as a minimization problem. This becomes a linear programming problem. For example, each constraint expression and the evaluation function (4) are expressed as a standard linear programming problem expressed by an expression (5).

$$Ax=b,\ x \geq 0_v,\ c^T x \text{ is minimized} \qquad \text{expression (5)}$$

Here, the symbol A is a matrix represented by each constraint expression and the evaluation function (4). The symbol x is an unknown column vector, and is a solution. The symbol b is a column vector represented by the measurement data information 21. "$0_v$" is a column vector in which all elements are 0. "$\geq$" is comparison for each element of the vector. The symbol T represents transposition of a matrix. The symbol c is a column vector. The x, b, c, and A are expressed by expressions (6) to (9), respectively.

$$x = \begin{pmatrix} T_{AB}, T_{AC}, T_{BA}, T_{BC}, T_{CA}, T_{CB}, S_{AB+}, S_{AB-}, S_{BC+}, \\ S_{BC-}, S_{BA+}, S_{BA-}, S_{CB+}, S_{CB-}, F_{AB}, F_{BC}, F_{BA}, F_{CB} \end{pmatrix}^T \quad \text{expression (6)}$$

$$b = \begin{pmatrix} G_A, A_A, G_B, A_B, G_C, A_C, P_{AB}, P_{AB}, \\ P_{BC}, P_{BC}, P_{BA}, P_{BA}, P_{CB}, P_{CB} \end{pmatrix}^T \quad \text{expression (7)}$$

$$c = (0, 0, 0, 0, 0, 0, 0, 0, 0, 0, 0, 0, 0, 0, 1, 1, 1, 1)^T \quad \text{expression (8)}$$

[Math. 1]

$$A = \begin{pmatrix}
1 & 1 & 0 & 0 & 0 & 0 & 0 & 0 & 0 & 0 & 0 & 0 & 0 & 0 & 0 & 0 & 0 & 0 \\
0 & 0 & 1 & 0 & 1 & 0 & 0 & 0 & 0 & 0 & 0 & 0 & 0 & 0 & 0 & 0 & 0 & 0 \\
0 & 0 & 1 & 1 & 0 & 0 & 0 & 0 & 0 & 0 & 0 & 0 & 0 & 0 & 0 & 0 & 0 & 0 \\
1 & 0 & 0 & 0 & 0 & 1 & 0 & 0 & 0 & 0 & 0 & 0 & 0 & 0 & 0 & 0 & 0 & 0 \\
0 & 0 & 0 & 0 & 1 & 1 & 0 & 0 & 0 & 0 & 0 & 0 & 0 & 0 & 0 & 0 & 0 & 0 \\
0 & 1 & 0 & 1 & 0 & 0 & 0 & 0 & 0 & 0 & 0 & 0 & 0 & 0 & 0 & 0 & 0 & 0 \\
1 & 1 & 0 & 0 & 0 & 0 & 1 & 0 & 0 & 0 & 0 & 0 & 0 & -1 & 0 & 0 & 0 & 0 \\
1 & 1 & 0 & 0 & 0 & 0 & 0 & -1 & 0 & 0 & 0 & 0 & 0 & 1 & 0 & 0 & 0 & 0 \\
0 & 1 & 0 & 1 & 0 & 0 & 0 & 0 & 1 & 0 & 0 & 0 & 0 & 0 & -1 & 0 & 0 & 0 \\
0 & 1 & 0 & 1 & 0 & 0 & 0 & 0 & 0 & -1 & 0 & 0 & 0 & 0 & 1 & 0 & 0 & 0 \\
0 & 0 & 1 & 0 & 1 & 0 & 0 & 0 & 0 & 0 & 1 & 0 & 0 & 0 & 0 & -1 & 0 & 0 \\
0 & 0 & 1 & 0 & 1 & 0 & 0 & 0 & 0 & 0 & 0 & -1 & 0 & 0 & 0 & 1 & 0 & 0 \\
0 & 0 & 0 & 0 & 1 & 1 & 0 & 0 & 0 & 0 & 0 & 0 & 1 & 0 & 0 & 0 & 0 & -1 \\
0 & 0 & 0 & 0 & 1 & 1 & 0 & 0 & 0 & 0 & 0 & 0 & -1 & 0 & 0 & 0 & 0 & 1
\end{pmatrix} \quad (9)$$

Here, the $F_{AB}$ in the expression (6) corresponds to the evaluation expression (3.1). The $F_{BC}$ in the expression (6) corresponds to the evaluation expression (3.2). The $F_{BA}$ in the expression (6) corresponds to the evaluation expression (3.3). The $F_{CB}$ in the expression (6) corresponds to the evaluation expression (3.4).

Next, the optimization unit 13 solves the linear programming problem expressed by the expression (5), and calculates the solution x that minimizes the evaluation function (4) including the evaluation expressions (3.1) to (3.4). In other words, the optimization unit 13 solves the given linear programming problem and calculates a value of the OD information that minimizes the evaluation function.

Specific Example of Optimization Unit

An example will be described of the result of solving the linear programming problem by the optimization unit 13 with reference to FIG. 7.

FIG. 7 is a diagram illustrating a specific example of the optimization unit.

Here, the solution x is calculated as follows.
$x=(0,50,50,20,20,40,0,0,0,0,0,0,0,0,0,0,0,0)^T$ The value of the evaluation function (4) is 0. From the first element of x, the OD information $T_{AB}$ between A and B is 0. From the second element of x, the OD information $T_{AC}$ between A and C is 50. From the third element of x, the OD information $T_{BA}$ between B and A is 50. From the fourth element of x, the OD information $T_{BC}$ between B and C is 20. From the fifth element of x, the OD information $T_{CA}$ between C and A is 20. From the sixth element of x, the OD information $T_{CB}$ between C and B is 40.

As a result, the OD information from 0:00 to 1:00 obtained as a solution is illustrated in the upper diagram of FIG. 7. In other words, the OD information $T_{AB}$ from 0:00 to 1:00 from A station to B station is 0. The OD information $T_{AC}$ from 0:00 to 1:00 from A station to C station is 50. The OD information $T_{BA}$ from 0:00 to 1:00 from B station to A station is 50. The OD information $T_{BC}$ from 0:00 to 1:00 from B station to C station is 20. The OD information $T_{CA}$ from 0:00 to 1:00 from C station to A station is 20. The OD information $T_{CB}$ from 0:00 to 1:00 from C station to B station is 40.

The solution x of the given linear programming problem is also calculated as follows.
$x=(40,10,10,60,60,0,0,0,0,0,0,0,0,0,0,0,0,0)^T$ The OD information from 0:00 to 1:00 obtained as a solution is illustrated in the lower diagram of FIG. 7. Thus, it can be seen that the solution optimized by the given linear programming problem is not unique. In other words, it can be seen that the solution is an indefinite solution.

Thus, in a case where the solution of the given linear programming problem is an indefinite solution, the indefiniteness determination unit 14 calculates the measure of the indefiniteness of the solution related to the existence range of the solutions. Here, a method will be described for determining the uniqueness of the solution of the linear programming problem and calculating the measure of the indefiniteness of the solution.

Determination of Uniqueness of Solution and
Calculation of Degree of Indefiniteness of Solution First, the given linear programming problem is expressed in a standard form as illustrated in the expression (5). The solution obtained by the optimization unit 13 is defined as $x_0$. A set of subscripts in which values of the elements are 0 among the elements of $x_0$ is defined as K, and a set of subscripts in which values of the elements are positive is defined as J. Furthermore, a matrix with $c^T$ added to the bottom row of A is defined as A'. The following theorem is used for determination of the uniqueness of the solution of the linear programming problem and calculation of the degree of the indefiniteness of the solution.

Theorem

The fact that $x_0$ is unique is equivalent to the following condition. Column vectors of $A'_J$ are linearly independent of each other, and an absolute value norm (sum of absolute values of elements) |x| of x that maximizes $1_v{}^T x_K$ under constraint conditions of $A'x=0_v$, and $x \geq -x_0$, is 0. However, $A'_J$ is a submatrix obtained by extracting only a column vector of an element J from A'. The symbol $0_v$ is a column vector in which all elements are 0. The symbol $x_K$ is a column vector obtained by extracting only an element K from x. The symbol $1_\nu$ is a column vector in which all elements are 1.

Proof (Proof of Contraposition)

It is assumed that there is a solution other than $x_0$. When the solution other than $x_0$ is set as $x_0+x$, since $x_0+x$ is the solution other than $x_0$, x is not $0_\nu$. Furthermore, obviously, A'x=$0_\nu$, and x≥$-x_0$ are satisfied. From x≥$-x_0$ and the definition of K, $x_K$≥$0_\nu$ is satisfied. Here, assuming that the column vectors of $A'_J$ are linearly independent of each other and $x_K$=$0_\nu$, $A'_J x_J$=$0_\nu$ is obtained from A'x=$0_\nu$, and $x_J$=$0_\nu$ is derived, which contradicts that x is not $0_\nu$. However, $x_J$ is a column vector obtained by extracting only an element J from x. Thus, in a case where it is assumed that there is the solution other than $x_0$, either one is satisfied that $x_K$ is not $0_\nu$ or that the column vectors of $A'_J$ are linearly dependent on each other. In a case where $x_K$ is not $0_\nu$, x that gives the maximum value of $1_\nu^T x_K$ is not $0_\nu$. The reverse proof can be similarly proved if it is noted that, in a case where the column vectors of $A'_J$ are linearly dependent on each other, $x_J$ is acquired that satisfies $A'_J x_J$=$0_\nu$ and is not $0_\nu$, and if $x_K$=$0_\nu$ is used and sufficiently small size is taken, the constraint condition x≥$-x_0$ is satisfied.

From the theorem, in a case where, for the solution $x_0$ obtained by the optimization unit 13, the column vectors of $A_J$ are linearly dependent on each other, or the column vectors of $A'_J$ is linearly independent of each other (satisfies the constraint conditions of the theorem) and x that maximizes $1_\nu^T x_K$ is not $0_\nu$, it is determined to be a case where the solution is not unique. Processing will be described later of the indefiniteness determination unit 14 in a case where the column vectors of $A'_J$ are linearly dependent on each other. In a case where the column vectors of $A'_J$ are linearly independent of each other, it can be seen from the proof of the theorem described above that $x_0+x$ is also the solution of the given linear programming problem.

Existence Range of Solutions

Figure 8:
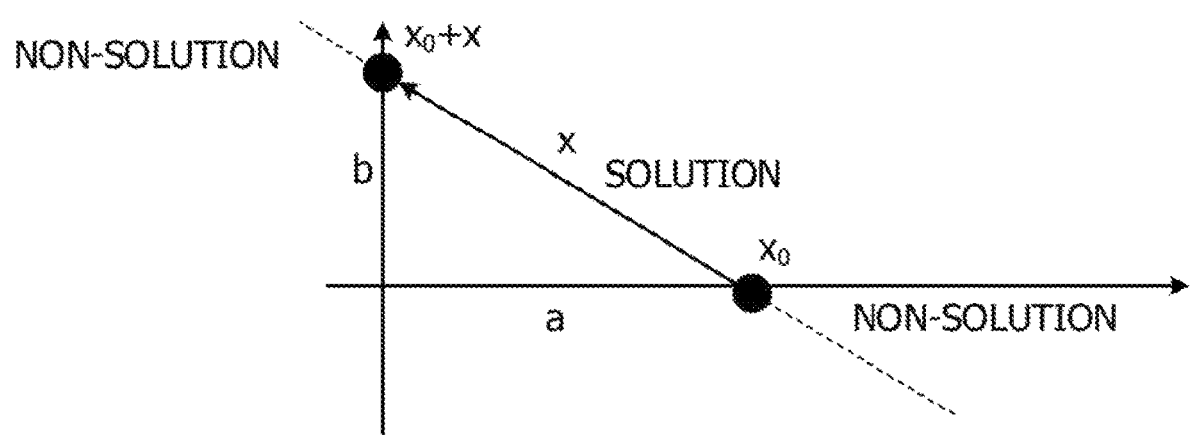
FIG. 8 is a diagram illustrating an existence range of solutions.

With these solutions as points in a high-dimensional space, the existence range of the solutions will be described with reference to FIG. 8. FIG. 8 is a diagram illustrating the existence range of the solutions. As illustrated in FIG. 8, because of convexity of the solution, all points on a line segment connecting two points $x_0$ and $x_0+x$ are also solutions.

Moreover, as a system of the theorem described above, in a case where the solution is not unique and the column vectors of $A'_J$ are linearly independent of each other, points extended to the outside from the line segment connecting the two points $x_0$ and $x_0+x$ (broken line in FIG. 8) is not a solution. That is, this line segment represents the existence range of the solutions. Therefore, the length of this line segment can be used as the measure of the indefiniteness of the solution of the given linear programming problem.

The length of this line segment can be obtained by, for example, the absolute value norm |x| of the displacement vector x (corresponding to a+b in FIG. 8). However, since the absolute value norm |x| of the displacement vector x increases with the number of unknown numbers of the OD information, an average value divided by the number of unknown numbers of the OD information (corresponding to (a+b)/2 in FIG. 8) is more preferable. Therefore, in the embodiment, as the measure of the indefiniteness of the solution of the given linear programming problem, a value is used obtained by dividing the absolute value norm |x| of x that maximizes $1_\nu^T x_K$ by the number of unknown numbers of the OD information.

Thus, the fact that the measure of the indefiniteness is 0 is equivalent to that the solution is unique. Since the degree of the indefiniteness of the solution can be quantitatively evaluated, it is possible to distinguish between a case where the indefiniteness of the solution is small and does not have an influence, and a case where the indefiniteness of the solution is large and has an influence.

The longest property will be supplementally described of the line segment connecting the two points $x_0$ and $x_0+x$. In the theorem described above, a line segment that maximizes $1_\nu^T x_K$ that is the sum total of values of elements K (corresponding to b in FIG. 8) is obtained from a viewpoint of processing efficiency, but the absolute value norm |x| (corresponding to a+b in FIG. 8) is not always the maximum. However, in the linear programming problem used in the estimation of the OD information of the traffic system, the matrix A has many elements of 0 and 1, and scales of respective dimensions are considered to be almost equal to each other. From this fact, it is expected that the absolute value norm |x| is the maximum line segment approximately by the theorem described above.

In calculation of the measure of the indefiniteness of the solution described above, since the column vectors of $A'_J$ may be linearly dependent on each other depending on the solution, in that case, the indefiniteness determination unit 14 corrects the solution so that the column vectors of $A'_J$ become linearly independent of each other and then calculates the measure. For correction of the solution, the column vectors are caused to be linearly independent of each other by increasing elements taking a value 0 in the solution to reduce the number of column vectors of $A'_J$. As a method for increasing the elements taking the value 0, for example, it is conceivable to solve a linear programming problem to which a constraint that the value matches 0 is added. Furthermore, since maximization of $1_\nu^T x_K$ is a linear programming problem, it can be solved by using a method of a conventional technique.

Specific Example of Calculation of Measure of Indefiniteness of Solution

The indefiniteness determination unit 14 applies the method described above to the problem taken up in FIGS. 2 to 7, to calculate the measure of the indefiniteness of the solution. The number of unknown numbers of the OD information is six.

First, $x_0$ is expressed as follows (upper diagram in FIG. 7).

$x_0 = (0,50,50,20,20,40,0,0,0,0,0,0,0,0,0,0,0,0)^T$

The indefiniteness determination unit 14 obtains, from the elements of $x_0$, a set of subscripts J in which values of the elements are positive, and a set of subscripts K in which values of the elements are 0, as follows. Subscripts are counted from one.

J={2,3,4,5,6}

K={1,7,8,9,10,11,12,13,14,15,16,17,18}

Thus, the indefiniteness determination unit 14 obtains $A'_J$ as in an expression (10).

[Math. 2]

$$A'_J = \begin{pmatrix} 1 & 0 & 0 & 0 & 0 \\ 0 & 1 & 0 & 1 & 0 \\ 0 & 1 & 1 & 0 & 0 \\ 0 & 0 & 0 & 0 & 1 \\ 0 & 0 & 0 & 1 & 1 \\ 1 & 0 & 01 & 0 & 0 \\ 1 & 0 & 0 & 0 & 0 \\ 1 & 0 & 0 & 0 & 0 \\ 1 & 0 & 1 & 0 & 0 \\ 1 & 0 & 1 & 0 & 0 \\ 0 & 1 & 0 & 1 & 0 \\ 0 & 1 & 0 & 1 & 0 \\ 0 & 0 & 0 & 1 & 1 \\ 0 & 0 & 0 & 1 & 1 \\ 0 & 0 & 0 & 0 & 0 \end{pmatrix} \quad (10)$$

It can be seen that the column vectors of the matrix $A'_J$ expressed by the expression (10) are linearly independent of each other.

Thus, the indefiniteness determination unit 14 maximizes $1_v^T x_K$ under constraint conditions of A'x=0 and x≥−x₀. Elements of x are represented by $x_1, x_2, \ldots, x_{18}$.

Then, x satisfying the constraint conditions is expressed as follows.

$x = x_1(1,-1,-1,1,1,-1,0,0,0,0,0,0,0,0,0,0,0,0)^T$, $x_1 \geq 0$, $x_1 \leq 40$ The evaluation function $1_v^T x_K$ is equal to $x_1$. Thus, the indefiniteness determination unit 14 obtains the maximum value of this linear programming problem as 40, and obtains the absolute value norm |x| as 240. Then, the indefiniteness determination unit 14 obtains a value 40 obtained by dividing 240 as the absolute value norm |x| by the number of unknown numbers 6 as the measure of the indefiniteness. The value 40 is equal to a difference between elements of the OD information in the upper diagram of FIG. 7 and the lower diagram of FIG. 7.

Then, the indefiniteness determination unit 14 determines whether or not the measure of the indefiniteness is greater than or equal to a predetermined threshold value. Here, the threshold value is 1. Then, since the measure of the indefiniteness exceeds the threshold value, the indefiniteness determination unit 14 determines that the OD information cannot be determined with the given data. In other words, the indefiniteness determination unit 14 determines that the indefiniteness of the OD information has an influence.

Influence of Indefiniteness of OD Information

Here, the influence will be described of the indefiniteness of the OD information. Even if the OD information is not uniquely determined, the OD information satisfies the constraint expressions obtained from the measurement data information 21 and minimizes the evaluation function, so if a traffic use environment does not change, the OD information can be used for congestion prediction and traffic jam prediction of the traffic system. However, for example, in a case where an abnormality occurs such as an accident, an unrealistic prediction result may be obtained in which accuracy is degraded due to the indefiniteness of the OD information. Thus, with the railroad route map taken up in FIG. 2 as an example, taking up a case where the train is delayed, it will be described that the indefiniteness of the OD information has an influence, in other words, causes degradation of prediction accuracy.

FIGS. 9A to 9D are diagrams illustrating the influence of the indefiniteness of the OD information.

First, as illustrated in FIG. 9A, it is assumed that correct answer OD information from 0:00 to 1:00 and correct answer OD information from 1:00 to 2:00 are obtained. Each piece of correct answer OD information can be obtained by, for example, a survey (questionnaire) for users who use the target railroad. Here, the upper left diagram in FIG. 9A illustrates the correct answer OD information from 0:00 to 1:00. Hereinafter, the correct answer OD information from 0:00 to 1:00 is referred to as a correct answer $OD_{01}$. The upper right diagram in FIG. 9A illustrates the correct answer OD information from 1:00 to 2:00. Hereinafter, the correct answer OD information from 1:00 to 2:00 is referred to as a correct answer $OD_{12}$.

Next, from the correct answer $OD_{01}$ and the correct answer $OD_{12}$, the measurement data information 21 is calculated indicating the number of entering and exiting people at each station from 1:00 to 2:00 and the number of passengers on a train at 2:00. Here, the middle diagram in FIG. 9A illustrates the number of entering and exiting people at each station from 1:00 to 2:00 and the number of passengers on the train at 2:00. The number of entering people $G_A$ at A station is 70. The number of exiting people $A_A$ at A station is 40. The number of entering people $G_B$ at B station is 50. The number of exiting people $A_B$ at B station is 70. The number of entering people $G_C$ at C station is 60. The number of exiting people $A_C$ at C station is 70. Then, the number of passengers $P_{AB}$ on the train from A station to B station (between A and B) is 70. The number of passengers $P_{BA}$ on the train from B station to A station (between B and A) is 40. The number of passengers $P_{BC}$ on the train from B station to C station (between B and C) is 70. The number of passengers $P_{CB}$ on the train from C station to B station (between C and B) is 60. The measurement data information 21 indicating the number of entering people at each station from 1:00 to 2:00 and the number of passengers on the train at 2:00 may be indicated by a reference sign $D_{12}$. The number of entering people at each station from 0:00 to 1:00 and the number of passengers on a train at 1:00 are as indicated by the reference sign $D_{01}$ in FIG. 5.

The measurement data information 21 illustrated in the middle of FIG. 9A is subjected to processing by the expression conversion unit 12 and processing by the optimization unit 13, whereby the OD information is calculated. Here, the lower diagram in FIG. 9A illustrates the OD information from 1:00 to 2:00 obtained as a solution. The OD information $T_{AB}$ from 1:00 to 2:00 from A station to B station is 50. The OD information $T_{AC}$ from 1:00 to 2:00 from A station to C station is 20. The OD information $T_{BA}$ from 1:00 to 2:00 from B station to A station is 0. The OD information $T_{BC}$ from 1:00 to 2:00 from B station to C station is 50. The OD information $T_{CA}$ from 1:00 to 2:00 from C station to A station is 40. The OD information $T_{CB}$ from 1:00 to 2:00 from C station to B station is 20. Hereinafter, the OD information from 1:00 to 2:00 obtained as the solution is referred to as a solution $OD_{12}$. Furthermore, the OD information (a solution $OD_{01}$) from 0:00 to 1:00 obtained as a solution is as illustrated in the upper diagram of FIG. 7.

Next, consideration is performed how the number of entering and exiting people at each station and the number of passengers on each train will be when the train at 1:00 is delayed by 30 minutes in the following two patterns as illustrated in FIG. 9B. The upper diagram of FIG. 96 illustrates a delay pattern x that is a case where the train is delayed by 30 minutes at A station and departs from A station at 1:30. The lower diagram of FIG. 9B illustrates a delay pattern y that is a case where the train is delayed by 30 minutes at B station and departs from B station at 1:30. For convenience of description, it is assumed that the user behaves as follows. The user uses the railroad in accordance with the correct answer OD information. The user arrives at the station uniformly at each time zone. Even if the train is delayed, the user does not take any other action and waits for the delayed train.

Next, as illustrated in FIG. 9C, for the delay pattern x and the delay pattern y, correct answers of the number of entering and exiting people at each station and the number of passengers on each train are calculated by using the correct answer $OD_{01}$ and the correct answer $OD_{12}$. In FIG. 9C, as a correct answer for the delay pattern x, the number of entering and exiting people at each station from 0:00 to 1:00 and the number of passengers on the train at 1:00 and 1:30 are calculated ($Dx_{01}$). As a correct answer for the delay pattern x, the number of entering and exiting people at each station from 1:00 to 2:00 and the number of passengers on the train at 2:00 are calculated ($Dx_{12}$). As a correct answer for the delay pattern y, the number of entering and exiting people at each station from 0:00 to 1:00 and the number of passengers on the train at 1:00 and 1:30 are calculated ($Dy_{01}$). As a correct answer for the delay pattern y, the number of entering and exiting people at each station from 1:00 to 2:00 and the number of passengers on the train at 2:00 are calculated ($Dy_{12}$).

On the other hand, as illustrated in FIG. 9D, for the delay pattern x and the delay pattern y, the number of entering and exiting people at each station and the number of passengers on each train are calculated by using the OD information obtained as the solutions (the solution $OD_{01}$ and the solution $OD_{12}$). In FIG. 9D, as an estimated value for the delay pattern x, the number of entering and exiting people at each station from 0:00 to 1:00 and the number of passengers on the train at 1:00 and 1:30 are calculated ($Dx_{01}'$). As an estimated value for the delay pattern x, the number of entering and exiting people at each station from 1:00 to 2:00 and the number of passengers on the train at 2:00 are calculated ($Dx_{12}'$). As an estimated value for the delay pattern y, the number of entering and exiting people at each station from 0:00 to 1:00 and the number of passengers on the train at 1:00 and 1:30 are calculated ($Dy_{01}'$). As an estimated value for the delay pattern y, the number of entering and exiting people at each station from 1:00 to 2:00 and the number of passengers on the train at 2:00 are calculated ($Dy_{12}'$).

Here, the correct answer for the delay pattern illustrated in FIG. 9C is compared with the estimated value for the delay pattern illustrated in FIG. 9D.

For example, the correct answer $Dx_{01}$ for the delay pattern x and the estimated value $Dx_{01}'$ for the delay pattern x are compared with each other. Then, the number of exiting people $A_B$ at B station in the correct answer $Dx_{01}$ for the delay pattern x is 20, whereas the number of exiting people $A_B$ at B station in the estimated value $Dx_{01}'$ for the delay pattern x is 40. Thus, it can be seen that the number of exiting people $A_B$ at B station in the estimated value $Dx_{01}'$ for the delay pattern x is different from the correct answer $Dx_{01}$ for the delay pattern x.

Furthermore, the correct answer $Dx_{12}$ for the delay pattern x and the estimated value $Dx_{12}'$ for the delay pattern x are compared with each other. Then, the number of exiting people $A_B$ at B station in the correct answer $Dx_{12}$ for the delay pattern x is 90, whereas the number of exiting people $A_B$ in B station in the estimated value $Dx_{12}'$ for the delay pattern x is 70. Thus, it can be seen that the number of exiting people $A_B$ at B station in the estimated value $Dx_{12}'$ for the delay pattern x is different from the correct answer $Dx_{12}$ for the delay pattern x.

Furthermore, the correct answer $Dy_{01}$ for the delay pattern y and the estimated value $Dy_{01}'$ for the delay pattern y are compared with each other. Then, the number of passengers $P_{BA}$ on the train from B station to A station (between B and A) in the correct answer $Dy_{01}$ for the delay pattern y is 80, whereas the number of passengers $P_{BA}$ on the train between B and A in the estimated value $Dy_{01}'$ for the delay pattern y is 70. Thus, it can be seen that the number of passengers $P_{BA}$ on the train between B and A in the estimated value $Dy_{01}'$ for the delay pattern y is different from the correct answer $Dy_{01}$ for the delay pattern y.

Furthermore, the correct answer $Dy_{12}$ for the delay pattern y and the estimated value $Dy_{12}'$ for the delay pattern y are compared with each other. Then, the number of passengers $P_{BA}$ on the train between B and A in the correct answer $Dy_{12}$ for the delay pattern y is 30, whereas the number of passengers $P_{BA}$ on the train between B and A in the estimated value $Dy_{12}'$ for the delay pattern y is 40. Thus, it can be seen that the number of passengers $P_{BA}$ on the train between B and A in the estimated value $Dy_{12}'$ for the delay pattern y is different from the correct answer $Dy_{12}$ for the delay pattern y.

Therefore, it can be seen that the indefiniteness of the OD information has an influence, in other words, causes degradation of the prediction accuracy.

Specific Example of Expression Correction Unit

Thus, the expression correction unit 15 corrects the expression by increasing the measurement data information 21 so that the indefiniteness of the OD information is reduced. Examples of a typical method include sharing of unknown numbers. The method defines common average OD information for a plurality of pieces of the measurement data information 21. By using the measurement data information 21 measured in a similar traffic use environment, the expression correction unit 15 can suppress an error due to sharing the OD information low.

The measurement data information 21 currently used is the measurement data information 21 ($D_{01}$) from 0:00 to 1:00 illustrated in FIG. 5. In other words, it is the number of entering and exiting people at each station from 0:00 to 1:00 and the number of passengers on the train at 1:00. Examples of the measurement data information 21 to be increased include the measurement data information 21 ($D_{12}$) from 1:00 to 2:00 when there is no delay illustrated in the middle diagram of FIG. 9A, and the measurement data information 21 ($Dx_{01}$, $Dx_{12}$) of the correct answer for the delay pattern x illustrated in FIG. 9C. In such an example, there are two types of the OD information of from 0:00 to 1:00 and from 1:00 to 2:00. The expression correction unit 15 generates an expression in which unknown numbers are shared by combining the measurement data information 21 when there is no delay and the measurement data information 21 for the delay pattern x. The number of unknown numbers is 12 including that in the case from 0:00 to 1:00 and that in the case from 1:00 to 2:00.

Thereafter, the optimization unit 13 solves the given linear programming problem for the expression corrected by the expression correction unit 15, and calculates the value of the OD information that minimizes the evaluation function. The calculated OD information, from 0:00 to 1:00, matches the correct answer OD information (the correct answer $OD_{01}$) from 0:00 to 1:00 illustrated in FIG. 9A. Furthermore, the calculated OD information, from 1:00 to 2:00, matches the OD information (the solution $OD_{12}$) from 1:00 to 2:00 illustrated in FIG. 9A.

Next, the indefiniteness determination unit 14 calculates the measure of the indefiniteness of the OD information that is the solution optimized by the optimization unit 13. In other words, the indefiniteness determination unit 14 calculates the existence range of the solutions. Here, the column vectors of $A'_J$ are linearly independent of each other, and the absolute value norm $|x|$ of x that maximizes $1_v^T x_K$ is 240. Thus, the indefiniteness determination unit 14 calculates a value 20 obtained by dividing the absolute value norm 240 by the number of unknown numbers 12 of the OD information, as the measure of OD information.

Then, the indefiniteness determination unit 14 determines whether or not the measure of the indefiniteness is greater than or equal to a predetermined threshold value. Here, the threshold value is 1. Then, since the measure of the indefiniteness "20" exceeds the threshold value "1", the indefiniteness determination unit 14 determines that the OD information cannot be determined with the given data. In other words, the indefiniteness determination unit 14 determines that there is an influence of the indefiniteness of the OD information.

Then, the expression correction unit 15 corrects the expression by increasing the measurement data information 21 so that the indefiniteness of the OD information is reduced. Examples of the measurement data information 21 to be increased include the measurement data information 21 ($D_{12}$) from 1:00 to 2:00 when there is no delay illustrated in the middle diagram of FIG. 9A, and the measurement data information 21 ($Dx_{01}$, $Dx_{12}$) of the correct answer for the delay pattern x illustrated in FIG. 9C. Moreover, examples of the measurement data information 21 to be increased include the measurement data information 21 ($Dy_{01}$, $Dy_{12}$) of the correct answer for the delay pattern y illustrated in FIG. 9C.

Thereafter, the optimization unit 13 solves the given linear programming problem for the expression corrected by the expression correction unit 15, and calculates the value of the OD information that minimizes the evaluation function. The calculated OD information, from 0:00 to 1:00, matches the correct answer OD information (the correct answer $OD_{01}$) from 0:00 to 1:00 illustrated in FIG. 9A. Furthermore, the calculated OD information, from 1:00 to 2:00, matches the correct answer OD information (the correct answer $OD_{12}$) from 1:00 to 2:00 illustrated in FIG. 9A.

Next, the indefiniteness determination unit 14 calculates the measure of the indefiniteness of the OD information that is the solution optimized by the optimization unit 13. In other words, the indefiniteness determination unit 14 calculates the existence range of the solutions. Here, the column vectors of $A'_J$ are linearly independent of each other, and the absolute value norm $|x|$ of x that maximizes $1_v^T x_K$ is 0. Thus, the indefiniteness determination unit 14 calculates a value 0 obtained by dividing the absolute value norm 0 by the number of unknown numbers of the OD information, as the measure of the OD information.

Then, the indefiniteness determination unit 14 determines whether or not the measure of the indefiniteness is greater than or equal to a predetermined threshold value. Here, the threshold value is 1. Then, since the measure of the indefiniteness "0" is less than the threshold value "1", the indefiniteness determination unit 14 determines that the indefiniteness is within an allowable range and the OD information can be determined with the given data. In other words, the indefiniteness determination unit 14 determines that there is no influence of the indefiniteness of the OD information.

Thereafter, the output unit 16 outputs the calculated OD information.

Flowchart of Estimation Processing

Next, a flowchart will be described of estimation processing according to the embodiment with reference to FIG. 10. FIG. 10 is a diagram illustrating an example of a flowchart of estimation processing according to the embodiment.

First, the input unit 11 reads the measurement data information 21 (step S11). For example, the input unit 11 inputs the number of entering people and the number of exiting people at each station and the number of passengers on the train between adjacent stations for a predetermined period, as the measurement data information 21. As an example, the measurement data information 21 is information measured by using a camera, a weight scale, or the like.

Then, the expression conversion unit 12 converts each data of the read measurement data information 21 into an expression that describes a model that is associated with a traffic system and estimates a traffic volume between a plurality of stations (step S12). For example, the expression conversion unit 12 converts each data of the measurement data information 21 into an expression including the constraint expressions, the evaluation expressions, and the evaluation function illustrated in FIG. 6. Such an expression has the OD information as an unknown number.

Then, the optimization unit 13 optimizes the linear programming problem including the expression converted by the expression conversion unit 12 (step S13). For example, the optimization unit 13 expresses the converted constraint expressions, evaluation expressions, and evaluation function as a standard linear programming problem represented by the expression (5), and calculates x expressed by the expression (6).

Then, the indefiniteness determination unit 14 calculates the measure of the indefiniteness of the solution optimized by the optimization unit 13 (step S14). A flowchart will be described later of the processing of calculating the measure of the indefiniteness of the solution.

Then, the indefiniteness determination unit 14 determines whether or not the measure of the indefiniteness of the solution is less than a threshold value (step S15).

In a case where it is determined that the measure of the indefiniteness of the solution is not less than the threshold value (step S15; No), the indefiniteness determination unit 14 determines that the OD information cannot be determined with the given data. In other words, the indefiniteness determination unit 14 determines that there is an influence of the indefiniteness of the OD information. Then, the expression correction unit 15 corrects the expression by increasing the measurement data information 21 so that the indefiniteness of the OD information is reduced (step S16). Then, the expression correction unit 15 proceeds to step S13 to cause the optimization unit 13 to perform optimization processing.

On the other hand, in a case where it is determined that the measure of the indefiniteness of the solution is less than the threshold value (step S15; Yes), the indefiniteness determination unit 14 determines that the indefiniteness is within an allowable range and the OD information can be determined with the given data. In other words, the indefiniteness determination unit 14 determines that there is no influence of the indefiniteness of the OD information. Then, the output unit 16 outputs an optimized result as the OD information (step S17). Then, the estimation processing ends.

Flowchart of Processing of Calculating Measure of Indefiniteness of Solution

Figure 11:
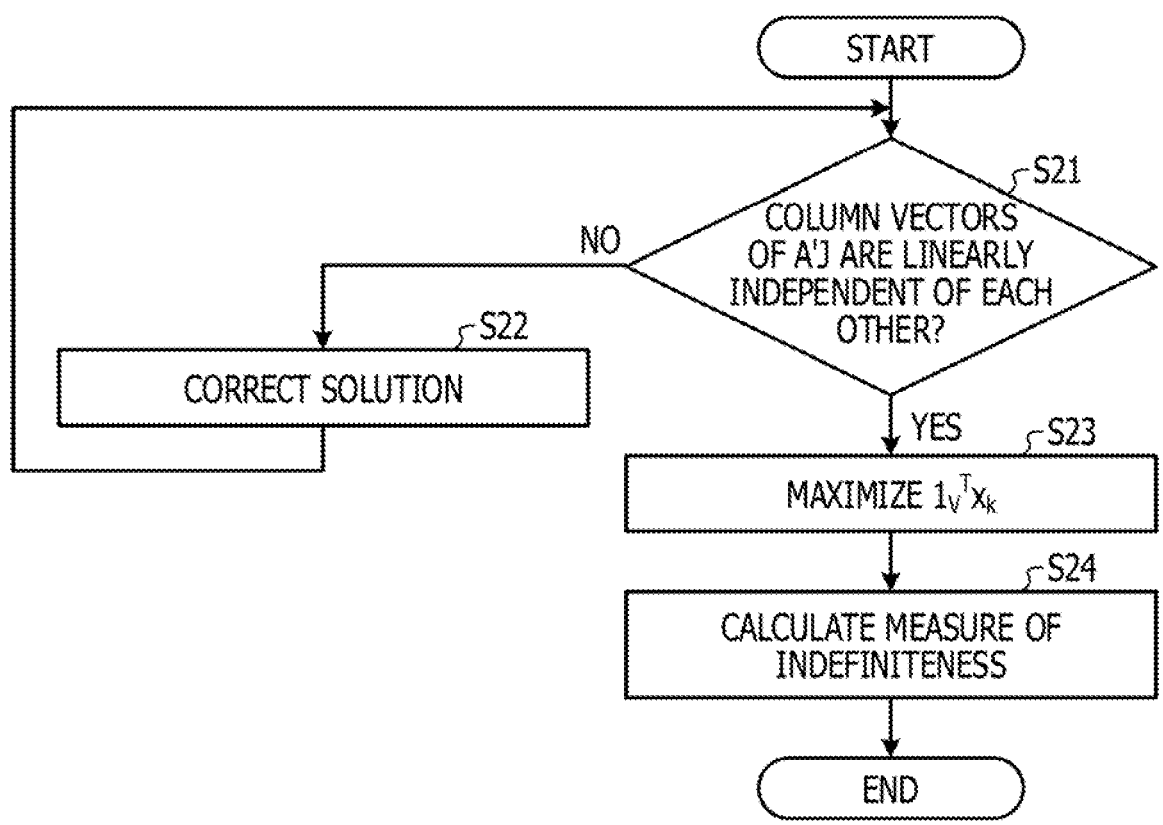
FIG. 11 is a diagram illustrating an example of a flowchart of processing of calculating a measure of indefiniteness of a solution according to the embodiment.

Next, a flowchart will be described of the processing of calculating the measure of the indefiniteness of the solution according to the embodiment with reference to FIG. 11. FIG. 11 is a diagram illustrating an example of the flowchart of the processing of calculating the measure of the indefiniteness of the solution according to the embodiment.

As illustrated in FIG. 11, the indefiniteness determination unit 14 determines whether or not the column vectors of $A'_J$ are linearly independent of each other (step S21). A' here refers to a matrix with $c^T$ added to the bottom row of A. $A'_J$ is a submatrix obtained by extracting only a column vector of an element J from A'. J indicates a set of subscripts in which values of the elements are positive among the elements of the solution $x_0$.

In a case where it is determined that the column vectors of $A'_J$ are not linearly independent of each other (step S21; No), the indefiniteness determination unit 14 corrects the solution so that the column vectors of $A'_J$ become linearly independent of each other (step S22). Then, the indefiniteness determination unit 14 proceeds to step S21.

On the other hand, in a case where it is determined that the column vectors of $A'_J$ are linearly independent of each other (step S21; Yes), the indefiniteness determination unit 14 calculates the absolute value norm of x that maximizes $1_v^T x_K$ (step S23).

Then, the indefiniteness determination unit 14 calculates a value obtained by dividing the calculated absolute value norm by the number of unknown numbers of the OD information, as the measure of the indefiniteness (step S24). Then, the processing of calculating the measure of the indefiniteness of the solution ends.

Effect of Embodiment

According to the above embodiment, the estimation device 1 calculates parameters of an expression that describes a model that is associated with a traffic system and estimates a traffic volume between a plurality of points, by using a plurality of measurement data measured in the traffic system that connects the plurality of points to each other, by using a method for solving an optimization problem. In a case where an indefinite solution is obtained by the calculation, the estimation device 1 generates indefiniteness information related to a range of the indefinite solution in the method for solving the optimization problem. The estimation device 1 determines addition of the plurality of measurement data or output of the indefinite solution, depending on the indefiniteness information. According to such a configuration, the estimation device 1 can be used for estimation of the OD information by using the plurality of measurement data in the expression. Then, even if the solution is an indefinite solution, the estimation device is enabled to add the measurement data by using the indefiniteness information related to the range of the indefinite solution, and can estimate appropriate OD information by using the plurality of measurement data including the added measurement data in the expression. Furthermore, the estimation device 1 can estimate appropriate OD information by using available data in the traffic system. Furthermore, the estimation device 1 can estimate the OD information reflecting an evaluation of appropriateness of the model and indicating the traffic volume between the plurality of points, for the model associated with the traffic system in which it is difficult to obtain measurement data.

Furthermore, according to the above embodiment, the estimation device 1 generates the indefiniteness information on the basis of the range of the indefinite solution in the method for solving the optimization problem and the number of the plurality of points. According to such a configuration, since the range of the indefinite solution increases with the number of the plurality of points, the estimation device 1 generates the indefiniteness information on the basis of the range of the indefinite solution and the number of the plurality of points, thereby being able to quantitatively obtain the measure of the range of the indefinite solution.

Furthermore, the measurement data are a generated traffic volume at each of the points, a concentrated traffic volume at each of the points, and an allocated traffic volume of a means of traffic. According to such a configuration, the estimation device 1 can estimate appropriate OD information by using available measurement data in any traffic system.

Furthermore, the estimation device 1 converts the plurality of measurement data into a linear equality constraint in which a constraint of a total amount of OD information is equal to a given generated traffic volume. The estimation device 1 converts the plurality of measurement data into a linear equality constraint in which the constraint of the total amount of the OD information is equal to a given concentrated traffic volume. The estimation device 1 performs conversion into an evaluation function including a difference between an allocated traffic volume estimated from the OD information and a given allocated traffic volume. Then, the estimation device 1 calculates parameters related to the OD information of the converted expressions by using the method for solving the optimization problem. According to such a configuration, the estimation device 1 can estimate the OD information by calculating the parameters related to the OD information by using the method for solving the optimization problem using the plurality of measurement data.

Furthermore, the method for solving the optimization problem is linear programming. According to such a configuration, the estimation device 1 can estimate the OD information at high speed by using linear programming.

Others

In the embodiment, the OD information is added up with reference to a departure point at a predetermined constant time interval (for example, 1 hour), but this is not a limitation. The OD information may be added up with reference to the departure point at an arbitrary time interval, or may be added up with reference to an arrival point at a predetermined constant time interval or an arbitrary time interval. The departure point reference is considered to be useful in a case where the user does not know the traffic environment change such as an accident. The arrival point reference is considered to be useful in prediction of future traffic demand by which the user knows a change in the traffic environment. Furthermore, the OD information may be estimated for each type of train such as a rapid train and a local train.

Furthermore, although it has been described that the expression conversion unit 12 performs conversion into the constraint expression regarding the number of entering and exiting people at the station, this is not a limitation. In a case where the number of entering and exiting people can be measured with a finer granularity than at the station, such as at a platform in the station, the expression conversion unit 12 may perform conversion into a constraint expression that takes the sum of the OD information depending on the granularity.

Furthermore, the expression conversion unit 12 assumes that the train operation time between stations is sufficiently short, but in a case where the train operation time between stations cannot be ignored, conversion may be performed into a constraint expression of the sum of the OD information considering the travel time on the train.

Furthermore, in a case where there is a plurality of types of trains such as a rapid train and a local train, the expression conversion unit 12 may perform conversion into an evaluation expression on the assumption that passengers use the train giving the shortest time, for example. This corresponds to a case where a plurality of routes exists between two points, in a general traffic system.

Furthermore, in a case where a measured value of the number of passengers includes an error and is expressed as a range of [a, b], the expression conversion unit 12 may use an evaluation expression that evaluates the number of passengers z predicted from the OD information with a function f(z) expressed as, for example, max (a−z, 0, z−b) instead of the absolute value of the difference.

Furthermore, it has been described that the expression correction unit 15 corrects the expression by increasing the measurement data information 21 so that the indefiniteness of the OD information is reduced. However, the expression correction unit 15 may correct the expression by adding a predetermined expression so that the indefiniteness of the OD information is reduced. For example, in a case where an average value $\mu_{ij}$ of the OD information from a station i to a station j is obtained from past statistics, the expression correction unit 15 corrects the expression by adding $\varepsilon\Sigma_{ij}|T_{ij}-\mu_{ij}|$ to the evaluation function. Here, $\varepsilon$ is a predetermined positive number. $\Sigma_{ij}$ indicates that the sum is obtained for all combinations of ij.

Furthermore, the estimation device 1 can be implemented by mounting each function such as the control unit 10 and the storage unit 20 described above on an information processing device such as a known personal computer or workstation.

Furthermore, each component of the illustrated device is not necessarily physically configured as illustrated in the drawings. In other words, a specific aspect of distribution and integration of the device is not limited to the illustrated one, and all or a part of the device can be functionally or physically distributed and integrated in an arbitrary unit depending on various loads, use states, and the like. For example, the input unit 11 and the output unit 16 may be integrated as one unit. On the other hand, the indefiniteness determination unit 14 may be distributed into a first determination unit that determines whether or not the solution is an indefinite solution, a calculation unit that calculates a measure of indefiniteness in a case where the solution is an indefinite solution, and a second determination unit that determines whether or not the measure of the indefiniteness is greater than or equal to a threshold value. Furthermore, the storage unit 20 may be connected as an external device of the estimation device 1, or may be connected via a network.

Furthermore, various types of processing described in the above embodiment can be implemented by executing a program prepared in advance on a computer such as a personal computer or a workstation. Thus, in the following description, an example will be described of the computer that executes an estimation program implementing a function similar to that of the estimation device 1 illustrated in FIG. 1. FIG. 12 is a diagram illustrating an example of the computer that executes the estimation program.

As illustrated in FIG. 12, a computer 200 includes a CPU 203 that executes various types of calculation processing, an input device 215 that accepts data input from a user, and a display control unit 207 that controls a display device 209. Furthermore, the computer 200 includes a drive device 213 that reads a program and the like from a storage medium, and a communication control unit 217 that exchanges data with another computer via a network. Furthermore, the computer 200 includes a memory 201 that temporarily stores various types of information, and an HDD 205. Then, the memory 201, the CPU 203, the HDD 205, the display control unit 207, the drive device 213, the input device 215, and the communication control unit 217 are connected to each other by a bus 219.

The drive device 213 is a device for a removable disk 210, for example. The HDD 205 stores an estimation program 205a and estimation related information 205b.

The CPU 203 reads the estimation program 205a, deploys the estimation program 205a on the memory 201, and executes the estimation program 205a as a process. Such a process corresponds to each functional unit of the estimation device 1. The estimation related information 205b corresponds to the measurement data information 21, for example. Then, for example, the removable disk 210 stores each piece of information such as the estimation program 205a.

The estimation program 205a does not necessarily have to be stored in the HDD 205 from the beginning. For example, the program is stored in a "portable physical medium" such as a flexible disk (FD), a CD-ROM, a DVD disk, a magneto-optical disk, or an IC card inserted in the computer 200. Then, the computer 200 may read the estimation program 205a from these media to execute the estimation program 205a.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a program that causes a computer to execute a process, the process comprising:

calculating parameters of an expression that describes a model that is associated with a traffic system and estimates a traffic volume between a plurality of points, by using a first plurality of measurement data measured in the traffic system that connects the plurality of points to each other, by using a method for solving an optimization problem, the first plurality of measurement data including a number of people entering each of the plurality of points and a number of people exiting each of the plurality of points;

obtaining estimation results of the traffic volume by using the model;

generating, when the estimation results are indefinite solutions, indefiniteness information that indicates closeness of the indefinite solutions in the method for solving the optimization problem;

determining whether the indefiniteness information is greater than or equal to a certain threshold;

when the indefiniteness information is not greater than or equal to the certain threshold, outputting the estimation results; and when the indefiniteness information is greater than or equal to the certain threshold, calculating the parameters so that the indefiniteness information decreases by adding a second plurality of measurement data measured in the traffic system at different timing from the first plurality of measurement data to the first plurality of measurement data.

2. The storage medium according to claim 1, wherein the generating process includes generating the indefiniteness information based on the range of the indefinite solution in the method for solving the optimization problem and a number of the plurality of points.

3. The storage medium according to claim 1, wherein the measurement data are a generated traffic volume at each of the points, a concentrated traffic volume at each of the points, and an allocated traffic volume of a means of traffic.

4. The storage medium according to claim 1, wherein the calculating process includes converting the plurality of measurement data into a linear equality constraint in which a constraint of a total amount of origin destination (OD) information is equal to a given generated traffic volume, a linear equality constraint in which the constraint of the total amount of the OD information is equal to a given concentrated traffic volume, and an evaluation function including a difference between an allocated traffic volume estimated from the OD information and a given allocated traffic volume, and calculating parameters related to the OD information of the converted expressions by using the method for solving the optimization problem.

5. The storage medium according to claim 1, wherein the method for solving the optimization problem is linear programming.

6. The storage medium according to claim 1, wherein the indefinite solutions are matrices which includes the parameters as a matrix elements, the closeness of the indefinite solutions indicates a ratio of an absolute value norm of a first indefinite solution and a second indefinite solution to a number of unknown parameters among the parameters.

7. The storage medium according to claim 6, wherein the process further comprising when the indefiniteness information is greater than or equal to the certain threshold, calculating the parameters by replacing the unknown parameters with the second plurality of measurement data measured in the traffic system.

8. An estimation device comprising:

a memory; and a processor coupled to the memory and the processor configured to:

calculate parameters of an expression that describes a model that is associated with a traffic system and estimates a traffic volume between a plurality of points, by using a first plurality of measurement data measured in the traffic system that connects the plurality of points to each other, by using a method for solving an optimization problem, the first plurality of measurement data including a number of people entering each of the plurality of points and a number of people exiting each of the plurality of points;

obtain estimation results of the traffic volume by using the model;

generate, when the estimation results are indefinite solutions, indefiniteness information that indicates closeness of the indefinite solutions in the method for solving the optimization problem;

determine whether the indefiniteness information is greater than or equal to a certain threshold;

when the indefiniteness information is not greater than or equal to the certain threshold, output the estimation results; and when the indefiniteness information is greater than or equal to the certain threshold, calculate the parameters so that the indefiniteness information decreases by adding a second plurality of measurement data measured in the traffic system at different timing from the first plurality of measurement data to the first plurality of measurement data.

9. An estimation method executed by a computer, the estimation method comprising:

calculating parameters of an expression that describes a model that is associated with a traffic system and estimates a traffic volume between a plurality of points, by using a first plurality of measurement data measured in the traffic system that connects the plurality of points to each other, by using a method for solving an optimization problem, the first plurality of measurement data including a number of people entering each of the plurality of points and a number of people exiting each of the plurality of points;

obtaining estimation results of the traffic volume by using the model;

generating, when the estimation results are indefinite solutions, indefiniteness information that indicates closeness of the indefinite solutions in the method for solving the optimization problem;

determining whether the indefiniteness information is greater than or equal to a certain threshold;

when the indefiniteness information is not greater than or equal to the certain threshold, outputting the estimation results; and when the indefiniteness information is greater than or equal to the certain threshold, calculating the parameters so that the indefiniteness information decreases by adding a second plurality of measurement data measured in the traffic system at different timing from the first plurality of measurement data to the first plurality of measurement data.

10. The estimation method according to claim 9, wherein the generating process includes generating the indefiniteness information based on the range of the indefinite solution in the method for solving the optimization problem and a number of the plurality of points.

11. The estimation method according to claim 9, wherein the measurement data are a generated traffic volume at each of the points, a concentrated traffic volume at each of the points, and an allocated traffic volume of a means of traffic.

12. The estimation method according to claim 9, wherein the calculating process includes:

converting the plurality of measurement data into a linear equality constraint in which a constraint of a total amount of origin destination (OD) information is equal to a given generated traffic volume, a linear equality constraint in which the constraint of the total amount of the OD information is equal to a given concentrated traffic volume, and an evaluation function including a difference between an allocated traffic volume estimated from the OD information and a given allocated traffic volume, and calculating parameters related to the OD information of the converted expressions by using the method for solving the optimization problem.

13. The estimation method according to claim 9, wherein the method for solving the optimization problem is linear programming.

14. The estimation method according to claim 9, wherein
the indefinite solutions are matrices which includes the parameters as a matrix elements,
the closeness of the indefinite solutions indicates a ratio of an absolute value norm of a first indefinite solution and a second indefinite solution to a number of unknown parameters among the parameters.

15. The estimation method according to claim 9, wherein the process further comprising
when the indefiniteness information is greater than or equal to the certain threshold, calculating the parameters by replacing the unknown parameters with the second plurality of measurement data measured in the traffic system.

* * * * *